(12) United States Patent
Miyakawa

(10) Patent No.: US 8,835,524 B2
(45) Date of Patent: Sep. 16, 2014

(54) RESIN PRECURSOR COMPOSITION AND RESIN OBTAINED BY PHOTOCURING THE SAME

(75) Inventor: Akiko Miyakawa, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/384,763

(22) PCT Filed: Jul. 20, 2010

(86) PCT No.: PCT/JP2010/062167
§ 371 (c)(1),
(2), (4) Date: Aug. 3, 2012

(87) PCT Pub. No.: WO2011/010633
PCT Pub. Date: Jan. 27, 2011

(65) Prior Publication Data
US 2012/0309863 A1  Dec. 6, 2012

(30) Foreign Application Priority Data
Jul. 22, 2009  (JP) ................................ P2009-171444

(51) Int. Cl.
*B41J 2/16* (2006.01)
*B29D 11/00* (2006.01)
*C08F 2/46* (2006.01)
*C08G 61/04* (2006.01)

(52) U.S. Cl.
USPC .................... 522/181; 522/178; 522/1; 520/1

(58) Field of Classification Search
USPC ................... 522/181, 178, 1; 520/1
See application file for complete search history.

(56) References Cited

U.S. PATENT DOCUMENTS

| 6,157,488 | A | 12/2000 | Ishii | |
| 2008/0094712 | A1 * | 4/2008 | Miyakawa | .................. 359/566 |

FOREIGN PATENT DOCUMENTS

| EP | 1830204 A1 | 9/2007 |
| JP | 09-127322 | 5/1997 |
| JP | 2006-022312 | * 1/2006 |
| JP | 2009-079013 | 4/2009 |
| WO | WO-2006/068137 A1 | 6/2006 |

OTHER PUBLICATIONS

International Search Report for PCT Application No. PCT/JP2010/062167, Aug. 24, 2010.
Written Opinion of the International Searching Authority for PCT Application No. PCT/JP2010/062167, Aug. 24, 2010.
Office Action dated Nov. 19, 2013, in Chinese Patent Application No. 201080041022.2.
Office Action (Notice of Reasons for Rejection) dated Apr. 1, 2014, in Japanese Patent Application No. 2011-523654.

\* cited by examiner

*Primary Examiner* — Ling Choi
*Assistant Examiner* — Jessica E Whiteley
(74) *Attorney, Agent, or Firm* — Miles & Stockbridge P.C.

(57) ABSTRACT

Disclosed is a resin precursor composition including a bifunctional (meth)acrylate containing a fluorine atom, a bifunctional (meth)acrylate having a fluorene structure, and a photopolymerization initiator, the resin precursor composition in which the formation of precipitates during its storage is suppressed; and a resin obtained from the same.
Specifically disclosed is a resin precursor composition that contains a bifunctional fluorine-containing (meth)acrylate (component A); a (meth)acrylate having a fluorene structure (component B); and a photopolymerization initiator (component C), wherein the component B includes a bifunctional (meth)acrylate having a fluorene structure (b-1) and a monofunctional (meth)acrylate having a fluorene structure (b-2) at a molar ratio (b-1):(b-2) of 90:10 to 70:30.

8 Claims, No Drawings

RESIN PRECURSOR COMPOSITION AND RESIN OBTAINED BY PHOTOCURING THE SAME

TECHNICAL FIELD

The present invention relates to a resin precursor composition, and also to a resin obtained by photocuring the same. More specifically, the present invention relates to a photocurable-type (meth)acrylic resin precursor composition for close-contact multilayer type diffractive optical elements or the like, and also to a resin obtained by photocuring the same.

BACKGROUND ART

Close-contact multilayer type diffractive optical elements, composed of optical materials, in which two optical components are in close contact and the interface thereof constitutes a diffraction grating, have advantages in that the band of wavelength used can be widened, and also that the alignment between the gratings can be easily carried out.

In these close-contact multilayer type diffractive optical elements, for example, as described in Patent Document 1, of the two optical components sandwiching a diffractive optical surface, it is required that one component exhibit the optical properties of relatively high refractive index and low dispersion while the other component exhibit the optical properties of relatively low refractive index and high dispersion.

With respect to the optical materials with low refractive index and high dispersion as described above, in recent years, research and development of resins with low refractive index and high dispersion that are excellent in terms of light weight and mass production has been advanced. As such resins, ultraviolet curable resins have been attracting attention. For example, it has been disclosed in patent Document 2 that optical components made of a homogeneous resin with low refractive index and high dispersion can be formed by using a bifunctional acrylate and/or methacrylate (hereinafter, simply referred to as a (meth)acrylate) containing a fluorine atom within the molecule, and a bifunctional (meth)acrylate having a fluorene structure.

CITATION LIST

Patent Documents

[Patent Document 1] Japanese Unexamined Patent Application, First Publication No. Hei 9-127322
[Patent Document 2] PCT International Patent Publication No. WO2006/068137 pamphlet

SUMMARY OF THE INVENTION

Technical Problem to be Solved

However, precipitates are formed at times during the storage of conventional resin precursor compositions that contain a bifunctional (meth)acrylate) containing a fluorine atom, a bifunctional (meth)acrylate having a fluorene structure, and a photopolymerization initiator. With respect to the resin precursor compositions that contain precipitates, because it is necessary to re-dissolve the precipitates by heating before use, the cost at the time of producing optical materials or the like is increased. In addition, it is also possible that the components in the resin precursor compositions may degrade due to the heating.

The present invention has been made in view of the above circumstances, and has an object of providing a resin precursor composition that contains a bifunctional (meth)acrylate containing a fluorine atom, a bifunctional (meth)acrylate having a fluorene structure, and a photopolymerization initiator, the resin precursor composition in which the formation of precipitates during its storage is suppressed; and a resin obtained from the same.

Solution to the Problem

In order to achieve the above object, the present invention employs the constitutions described below.

(1) A resin precursor composition including: a bifunctional fluorine-containing acrylate and/or a bifunctional fluorine-containing methacrylate (component A); an acrylate having a fluorene structure and/or a methacrylate having a fluorene structure (component B); and a photopolymerization initiator (component C), in which the aforementioned component B includes a bifunctional acrylate having a fluorene structure and/or a bifunctional methacrylate having a fluorene structure (b-1), and a monofunctional acrylate having a fluorene structure and/or a monofunctional methacrylate having a fluorene structure (b-2) at a molar ratio (b-1):(b-2) of 90:10 to 70:30.

(2) The resin precursor composition according to the above aspect (1), in which the aforementioned component A is a compound represented by the following general formula (a-1):

[Chemical Formula 1]

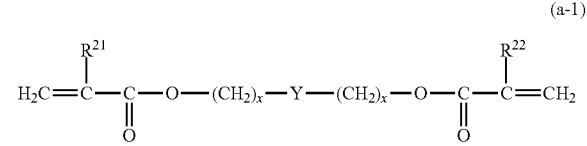

(a-1)

[In the formula, each of $R^{21}$ and $R^{22}$ independently represents a hydrogen atom or a methyl group; x represents an integer of 1 to 2; and Y represents a perfluoroalkyl group of 2 to 12 carbon atoms or $-(CF_2-O-CF_2)_z-$, in which the above z represents an integer of 1 to 4].

(3) The resin precursor composition according to the above aspect (1) or (2), in which the above (b-1) is a compound represented by the following general formula (b-1-1) and/or a compound represented by the following general formula (b-1-2):

[Chemical Formula 2]

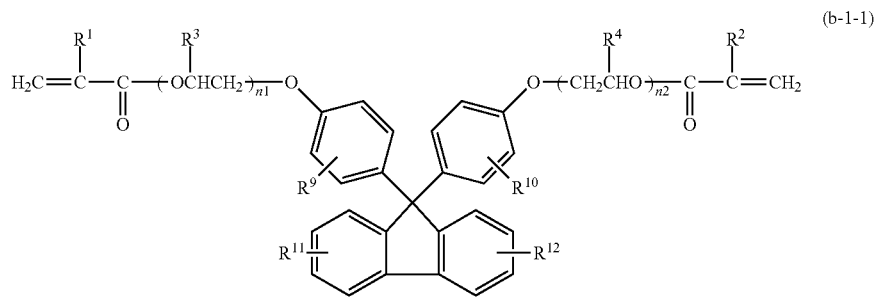

(b-1-1)

[In the formula, each of $R^1$ and $R^2$ independently represents a hydrogen atom or a methyl group; each of $R^3$ and $R^4$ independently represents a hydrogen atom, a methyl group or an ethyl group; each of $R^9$, $R^{10}$, $R^{11}$ and $R^{12}$ independently represents a hydrogen atom, a fluorine atom, an alkyl group of 1 to 6 carbon atoms, or a phenyl group in which a hydrogen atom may be substituted by a fluorine atom or an alkyl group of 1 to 6 carbon atoms; and each of n1 and n2 independently represents an integer of 0 to 3.]

[Chemical Formula 3]

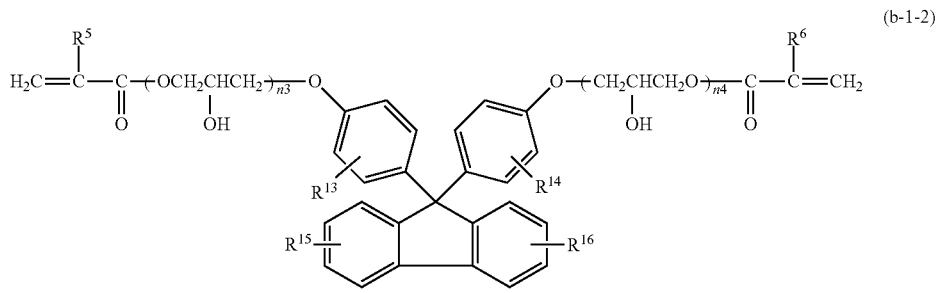

(b-1-2)

[In the formula, each of $R^5$ and $R^6$ independently represents a hydrogen atom or a methyl group; each of $R^{13}$, $R^{14}$, $R^{15}$ and $R^{16}$ independently represents a hydrogen atom, a fluorine atom, an alkyl group of 1 to 6 carbon atoms, or a phenyl group in which a hydrogen atom may be substituted by a fluorine atom or an alkyl group of 1 to 6 carbon atoms; and each of n3 and n4 independently represents an integer of 1 to 3.]

(4) The resin precursor composition according to any one of the above aspects (1) to (3), in which the above (b-2) is a compound represented by the following general formula (b-2-1):

[Chemical Formula 4]

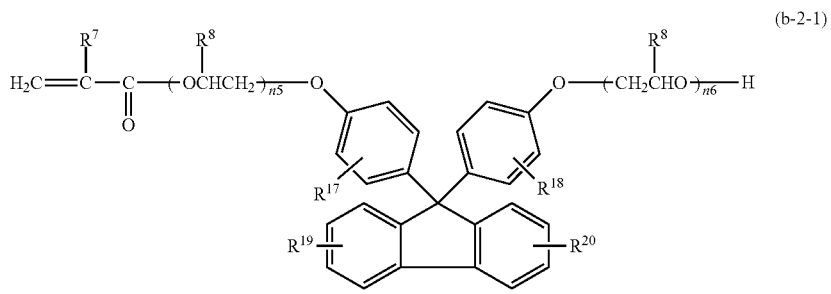

(b-2-1)

[In the formula, $R^7$ represents a hydrogen atom or a methyl group; $R^8$ represents a hydrogen atom or a linear or branched alkyl group of 1 to 6 carbon atoms; each of $R^{17}$, $R^{18}$, $R^{19}$ and $R^{20}$ independently represents a hydrogen atom, a fluorine atom, an alkyl group of 1 to 6 carbon atoms, or a phenyl group in which a hydrogen atom may be substituted by a fluorine atom or an alkyl group of 1 to 6 carbon atoms; and each of n5 and n6 independently represents an integer of 0 to 10.]

(5) The resin precursor composition according to any one of the above aspects (1) to (4), which is a resin precursor composition for close-contact multilayer type diffractive optical elements.

(6) A photocurable resin obtained by photocuring the resin precursor composition described in any one of the above aspects (1) to (5).

(7) The resin according to the above aspect (6), in which a refractive index $n_d$ is equal to or less than 1.54, and a mean dispersion $(n_F - n_C)$ is equal to or more than 0.0145.

(8) A resin precursor composition including: a bifunctional fluorine-containing acrylate and/or a bifunctional fluorine-containing methacrylate (component A); an acrylate having a fluorene structure and/or a methacrylate having a fluorene structure (component B); and a photopolymerization initiator (component C), in which the aforementioned component B includes a bifunctional acrylate having a fluorene structure and a monofunctional acrylate having a fluorene structure.

Effects of the Invention

According to the resin precursor composition of the present invention, since the formation of precipitates can be suppressed during the storage thereof, an operation in order to remove the precipitates before using the composition becomes unnecessary. In addition, according to the photocurable resin of the present invention, it is possible to form a homogenous resin layer with a low refractive index and high dispersion.

DETAILED DESCRIPTION OF THE EMBODIMENTS

A resin precursor composition of the present invention includes: a bifunctional fluorine-containing acrylate and/or a bifunctional fluorine-containing methacrylate (hereafter, may be described as a "bifunctional fluorine-containing (meth)acrylate (component A)" in the present application); an acrylate having a fluorene structure and/or a methacrylate having a fluorene structure (hereafter, may be described as a "(meth)acrylate having a fluorene structure" in the present application) (component B); and a photopolymerization initiator (component C).

When the above resin precursor composition is irradiated with light, a resin can be obtained, in which the aforementioned component A and the aforementioned component B are polymerized due to the action of the aforementioned component C.

In the resin precursor composition of the present invention, if the content of the component A is increased, the refractive index of the resin reduces, although the level of dispersion also reduces. Further, if the content of the component B is increased, although the dispersion level of the resin increases, the refractive index thereof also increases.

Accordingly, in order to achieve optical properties of low refractive index and high dispersion that are suitable for using a resin obtained from the resin precursor composition of the present invention in close-contact multilayer type diffractive optical elements, the content of the component A within the resin precursor composition is preferably not less than 10% by weight but not more than 80% by weight, and also the content of the component B within the resin precursor composition is preferably not less than 10% by weight but not more than 80% by weight. In addition, the content of the component C within the resin precursor composition is preferably not less than 0.1% by weight but not more than 5% by weight.

Hereafter, the aforementioned components A, B and C in the resin precursor composition of the present invention will be described in detail.

<Component A>

In the resin precursor composition of the present invention, the component A is one or more type of bifunctional fluorine-containing (meth)acrylate. There are no particular limitations on the bifunctional fluorine-containing (meth)acrylate as long as it is capable of copolymerizing with the components A and B to form a (meth)acrylic resin, although, for example, a compound represented by the following general formula (a-1) is suitable in obtaining the resin with the optical properties of low refractive index and high dispersion.

[Chemical Formula 5]

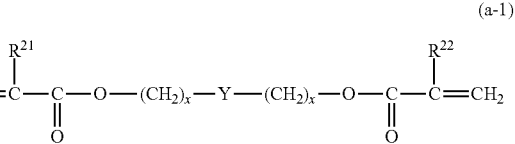

[In the formula, each of $R^{21}$ and $R^{22}$ independently represents a hydrogen atom or a methyl group; x represents an integer of 1 to 2; and Y represents a perfluoroalkyl group of 2 to 12 carbon atoms or $-(CF_2-O-CF_2)_z-$, in which the above z represents an integer of 1 to 4].

In the above general formula (a-1), each of $R^{21}$ and $R^{22}$ independently represents a hydrogen atom or a methyl group.

In the above general formula (a-1), x is an integer of 1 to 2, and preferably 1, since the optical properties of the resin are improved. In the above general formula (a-1), the plurality of x may be the same or different from each other.

In the above general formula (a-1), Y represents a perfluoroalkyl group of 2 to 12 carbon atoms or $-(CF_2-O-CF_2)_z-$, and preferably a perfluoroalkyl group of 2 to 12 carbon atoms.

In those cases where the above Y represents a perfluoroalkyl group of 2 to 12 carbon atoms, the number of carbon atoms is preferably from 2 to 8, more preferably from 2 to 6, and most preferably from 3 to 5, since the optical properties of the resin are improved.

In those cases where the above Y represents $-(CF_2-O-CF_2)_z-$, z is an integer of 1 to 4.

The above z is preferably 1 to 3, more preferably 1 or 2, and most preferably 1, from the viewpoints of easy availability and excellent compatibility.

Specific example of the aforementioned bifunctional fluorine-containing (meth)acrylates include 1,4-di(meth)acryloyloxy-2,2,3,3-tetrafluorobutane, 1,6-di(meth)acryloyloxy-3,3,4,4-tetrafluorohexane, 1,6-di(meth)acryloyloxy-3,3,4,4-tetrafluorohexane, 1,6-di(meth)acryloyloxy-2,2,3,3,4,4,5,5-octafluorohexane, 1,8-di(meth)acryloyloxy-3,3,4,4,5,5,6,6-octafluorooctane, 1,8-di(meth)acryloyloxy-2,2,3,3,4,4,5,5,6,6,7,7-dodecafluorooctane, 1,9-di(meth)acryloyloxy-2,2,3,3,4,4,5,5,6,6,7,7,8,8-tetradecafluorononane, 1,10-di(meth)

acryloyloxy-2,2,3,3,4,4,5,5,6,6,7,7,8,8,9,9-hexadecafluorodecane and 1,12-di(meth)acryloyloxy-2,2,3,3,4,4,5,5,6,6,7,7,8,8,9,9,10,10,11,1'-icosafluorododecane.

In addition, ethylene oxide-modified fluorinated bisphenol A di(meth)acrylate, propylene oxide-modified fluorinated bisphenol A di(meth)acrylate, and the like can also be used as the bifunctional fluorine-containing (meth)acrylates.

The component A in the resin precursor composition of the present invention may be composed of one type of bifunctional fluorine-containing (meth)acrylate, or may be composed of two or more types of bifunctional fluorine-containing (meth)acrylates.

In order to achieve optical properties of low refractive index and high dispersion that are suitable for using a resin obtained from the resin precursor composition of the present invention in close-contact multilayer type diffractive optical elements, the content of the aforementioned component A within the above resin precursor composition is preferably not less than 10% by weight but not more than 80% by weight, more preferably not less than 20% by weight but not more than 70% by weight, and most preferably not less than 30% by weight but not more than 60% by weight.

<Component B>

In the resin precursor composition of the present invention, the component B is one or more types of (meth)acrylates having a fluorene structure, and also the above component B is characterized by including a bifunctional (meth)acrylate having a fluorene structure (b-1), and a monofunctional (meth)acrylate having a fluorene structure (b-2) at a molar ratio (b-1):(b-2) of 90:10 to 70:30 {that is, the ratio of (b-1) to (b-2) in molar ratio is not less than 2.33 but not more than 9.00}. It should be noted that the above range includes those cases where (b-1):(b-2)=90:10 (molar ratio) and (b-1):(b-2)=70:30 (molar ratio).

Because the component B, i.e., the bifunctional (meth)acrylate having a fluorene structure contains the above (b-1) and (b-2), it is possible to suppress the formation of precipitates during storage of the resin precursor composition of the present invention. It is preferable to mix these (meth)acrylates at the above molar ratio.

On the other hand, in those cases where the component B is composed of (b-1) and hardly contains (b-2) {namely, when the (b-2) content in the component B, if contained as impurities, is not more than 5% in molar ratio}, like the conventional resin precursor compositions as disclosed in Patent Document 2, precipitates are often formed within the resin precursor composition during the storage thereof. Since the precipitates can be redissolved by heating the resin precursor composition in which the precipitates have formed, it is thought that the precipitates are not formed as a result of polymerization of the aforementioned components A and B.

In addition, since the shape thereof is a microcrystalline form, it is presumed that they are precipitates of the component B having a fluorene ring skeleton with relatively low solubility. Accordingly, the inventors of the present invention have conducted extensive studies. As a result, they discovered that by using a mixture prepared by mixing (b-1) and (b-2) at the above molar ratio as the component B, the formation of precipitates during the storage of the resin precursor composition may be suppressed. Although the mechanism thereof is uncertain at the time of filing the present application, as a hypothesis, it is thought that the precipitates are microcrystals of (b-1), and the crystallization thereof is inhibited by the addition of (b-2) to stop the precipitation.

The present invention is superior in that a resin obtained from the resin precursor composition exhibits excellent optical properties of low refractive index and high dispersion as before, while the formation of precipitates may be suppressed as described above.

The range for the content ratio (molar ratio) of the above (b-1) and (b-2) is more preferably from 88:12 to 70:30, still more preferably from 80:20 to 70:30, and most preferably from 80:20 to 75:25. Furthermore, in those cases where the ratio is at the ends of each range, they are also included in this range.

When the ratio is at least as large as the lower limit of the above-mentioned range, the compatibility of each component in the resin precursor composition is satisfactory, and thus it is possible to prevent the resin precursor composition from becoming cloudy during the preparation thereof. In addition, when the ratio is not more than the upper limit of the above-mentioned range, the effects of the present invention for preventing the formation of precipitates during the storage of the resin precursor composition can be further improved. As the above (b-1), for example, a compound represented by the following general formula (b-1-1) or a compound represented by the following general formula (b-1-2) is preferable in obtaining the resin with the optical properties of low refractive index and high dispersion.

[Chemical Formula 6]

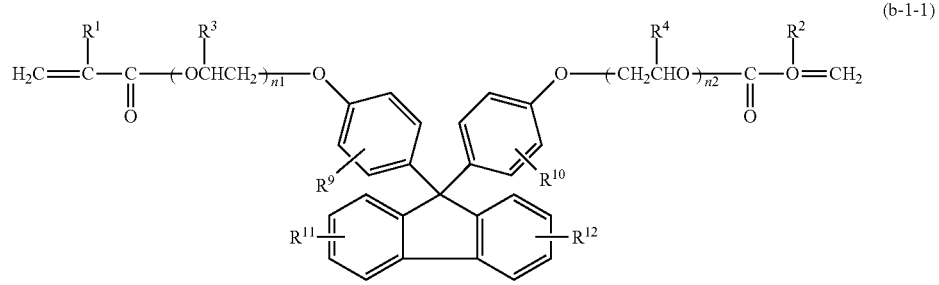

(b-1-1)

[In the formula, each of $R^1$ and $R^2$ independently represents a hydrogen atom or a methyl group; each of $R^3$ and $R^4$ independently represents a hydrogen atom, a methyl group or an ethyl group; each of $R^9$, $R^{10}$, $R^{11}$ and $R^{12}$ independently represents a hydrogen atom, a fluorine atom, an alkyl group of 1 to 6 carbon atoms, or a phenyl group in which a hydrogen atom may be substituted by a fluorine atom or an alkyl group of 1 to 6 carbon atoms; and each of n1 and n2 independently represents an integer of 0 to 3.]

[Chemical Formula 7]

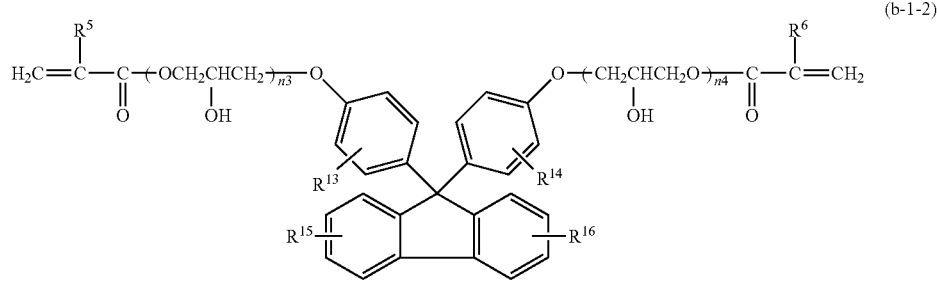

(b-1-2)

[In the formula, each of $R^5$ and $R^6$ independently represents a hydrogen atom or a methyl group; each of $R^{13}$, $R^{14}$, $R^{15}$ and $R^{16}$ independently represents a hydrogen atom, a fluorine atom, an alkyl group of 1 to 6 carbon atoms, or a phenyl group in which a hydrogen atom may be substituted by a fluorine atom or an alkyl group of 1 to 6 carbon atoms; and each of n3 and n4 independently represents an integer of 1 to 3.]

In the above general formula (b-1-1), each of $R^1$ and $R^2$ independently represents a hydrogen atom or a methyl group.

In the above general formula (b-1-1), each of $R^3$ and $R^4$ independently represents a hydrogen atom, a methyl group or an ethyl group, and a hydrogen atom is preferable since it is readily available.

In the above general formula (b-1-1), each of $R^9$, $R^{10}$, $R^{11}$ and $R^{12}$ independently represents a hydrogen atom, a fluorine atom, an alkyl group of 1 to 6 carbon atoms, or a phenyl group in which a hydrogen atom may be substituted by a fluorine atom or an alkyl group of 1 to 6 carbon atoms.

The alkyl group of 1 to 6 carbon atoms may be any one of linear, branched or cyclic alkyl groups, and linear or branched alkyl groups are preferred because they are readily available.

Examples of the linear or branched alkyl groups include a methyl group, an ethyl group, a propyl group, an isopropyl group, an n-butyl group, an isobutyl group, a tert-butyl group, an n-pentyl group, an isopentyl group, a neopentyl group, an n-hexyl group, an isohexyl group and a neohexyl group, and a methyl group or an ethyl group is preferable because it is readily available.

Examples of the cyclic alkyl groups include a cyclopropyl group, a cyclobutyl group, a cyclopentyl group and a cyclohexyl group, and a cyclopentyl group or a cyclohexyl group is preferable because it is readily available.

The aforementioned "phenyl group in which a hydrogen atom may be substituted by a fluorine atom or an alkyl group of 1 to 6 carbon atoms" refers to a phenyl group in which part or all of the hydrogen atoms have been substituted by a fluorine atom or an alkyl group of 1 to 6 carbon atoms. The alkyl group of 1 to 6 carbon atoms is preferably a methyl group or an ethyl group, because it is readily available.

In the above general formula (b-1-1), each of n1 and n2 independently represents an integer of 0 to 3. Each of n1 and n2 is independently and preferably 0 to 2, more preferably 0 or 1, and most preferably 1, since the resin exhibits high levels of hardness and transparency, and the optical properties thereof are also improved.

In the above general formula (b-1-2), each of $R^5$ and $R^6$ independently represents a hydrogen atom or a methyl group.

In the above general formula (b-1-2), each of $R^{13}$, $R^{14}$, $R^{15}$ and $R^{16}$ independently represents a hydrogen atom, a fluorine atom, an alkyl group of 1 to 6 carbon atoms, or a phenyl group in which a hydrogen atom may be substituted by a fluorine atom or an alkyl group of 1 to 6 carbon atoms.

The explanations for these groups are the same as those provided for $R^9$, $R^{10}$, $R^{11}$ and $R^{12}$ in the above general formula (b-1-1).

In the above general formula (b-1-2), each of n3 and n4 independently represents an integer of 1 to 3. Each of n3 and n4 is independently and preferably 1 or 2, and most preferably 1, since the resin exhibits high levels of hardness and transparency, and the optical properties thereof are also improved.

As (b-1) included in the component B in the resin precursor composition of the present invention, compounds represented by the following chemical formulae (b-1-01) to (b-1-05) and the following chemical formulae (b-1-06) to (b-1-10) are particularly preferred. Note that with respect to the compound represented by the following chemical formulae (b-1-06) to (b-1-10), each of the phenyl groups corresponding to $R^{13}$ and $R^{14}$ may independently substitute a hydrogen atom at the ortho position or may substitute a hydrogen atom at the meta position.

[Chemical Formula 8]

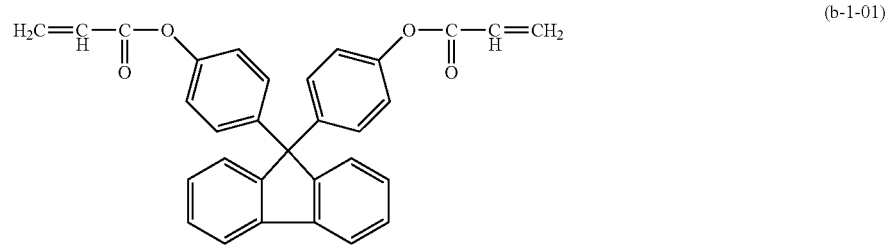

(b-1-01)

-continued
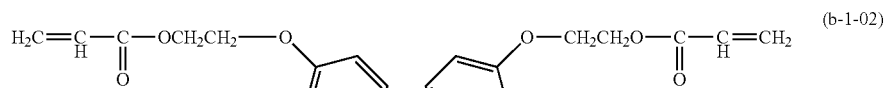
(b-1-02)
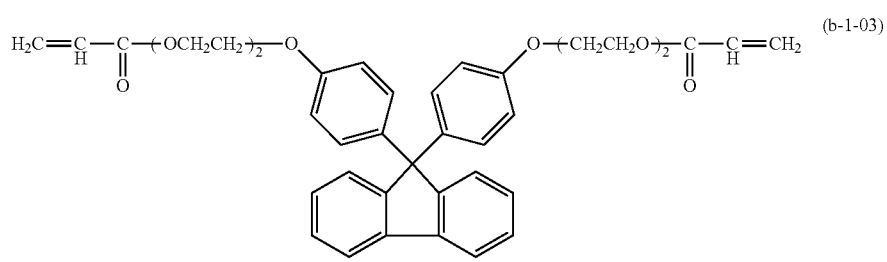
(b-1-03)
[Chemical Formula 9]
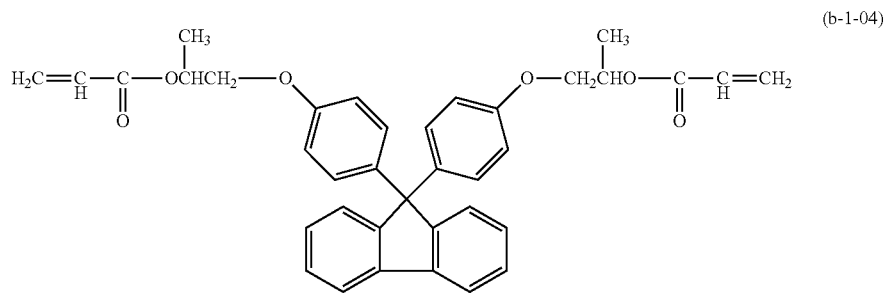
(b-1-04)
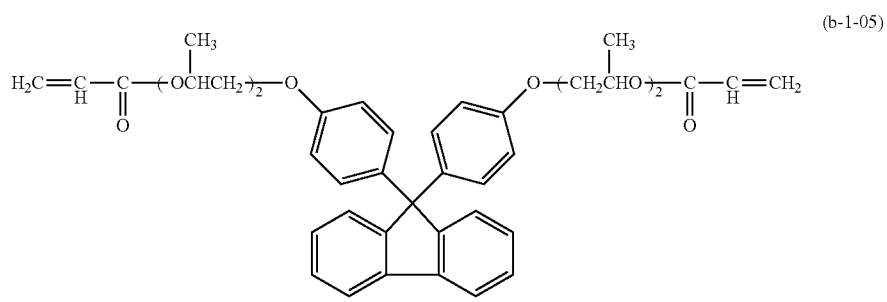
(b-1-05)
[Chemical Formula 10]
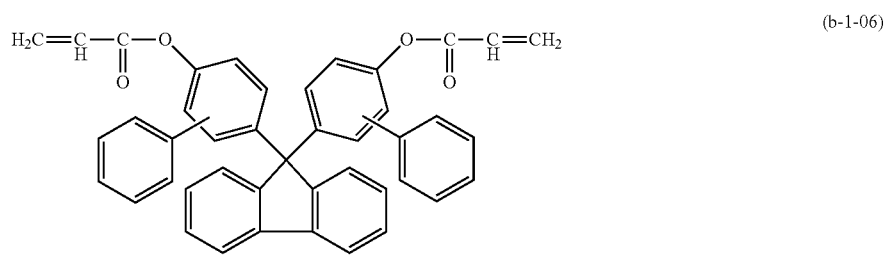
(b-1-06)
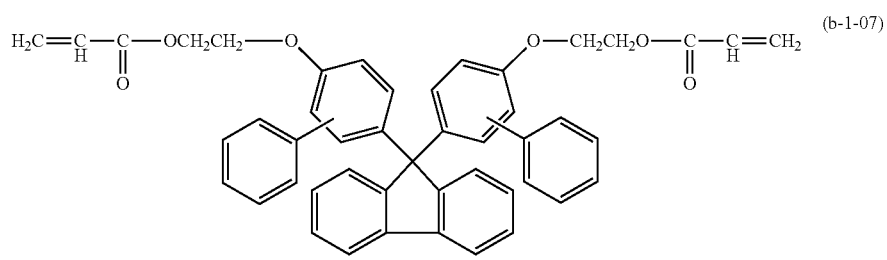
(b-1-07)

-continued

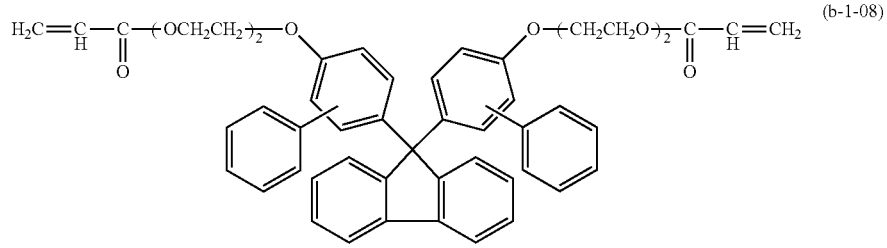
(b-1-08)

[Chemical Formula 11]

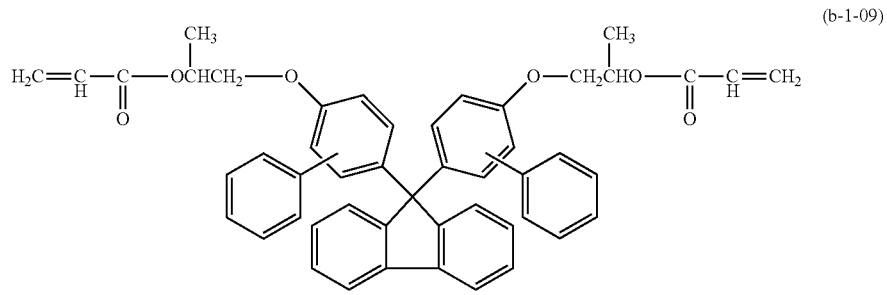
(b-1-09)

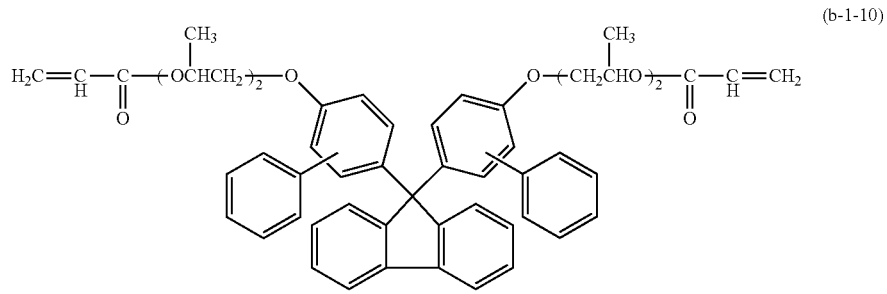
(b-1-10)

As the above (b-2), for example, a compound represented by the following general formula (b-2-1) is preferable in obtaining the resin with the optical properties of low refractive index and high dispersion.

[Chemical Formula 12]

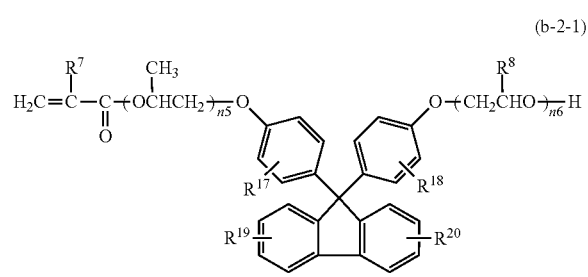
(b-2-1)

[In the formula, $R^7$ represents a hydrogen atom or a methyl group; $R^8$ represents a hydrogen atom or a linear or branched alkyl group of 1 to 6 carbon atoms; each of $R^{17}$, $R^{18}$, $R^{19}$ and $R^{20}$ independently represents a hydrogen atom, a fluorine atom, an alkyl group of 1 to 6 carbon atoms, or a phenyl group in which a hydrogen atom may be substituted by a fluorine atom or an alkyl group of 1 to 6 carbon atoms; and each of n5 and n6 independently represents an integer of 0 to 10.]

In the above general formula (b-2-1), $R^7$ represents a hydrogen atom or a methyl group.

In the above general formula (b-2-1), $R^8$ represents a hydrogen atom or a linear or branched alkyl group of 1 to 6 carbon atoms, and a hydrogen atom is preferable since it is readily available.

Examples of the linear or branched alkyl groups of 1 to 6 carbon atoms include a methyl group, an ethyl group, a propyl group, an isopropyl group, an n-butyl group, an isobutyl group, a tert-butyl group, an n-pentyl group, an isopentyl group, a neopentyl group, an n-hexyl group, an isohexyl group and a neohexyl group, and a methyl group or an ethyl group is preferable because it is readily available.

In the above general formula (b-2-1), each of $R^{17}$, $R^{18}$, $R^{19}$ and $R^{20}$ independently represents a hydrogen atom, a fluorine atom, an alkyl group of 1 to 6 carbon atoms, or a phenyl group in which a hydrogen atom may be substituted by a fluorine atom or an alkyl group of 1 to 6 carbon atoms.

The alkyl group of 1 to 6 carbon atoms may be any one of linear, branched or cyclic alkyl groups, and linear or branched alkyl groups are preferred because they are readily available.

Examples of the linear or branched alkyl groups include a methyl group, an ethyl group, a propyl group, an isopropyl group, an n-butyl group, an isobutyl group, a tert-butyl group, an n-pentyl group, an isopentyl group, a neopentyl group, an n-hexyl group, an isohexyl group and a neohexyl group, and a methyl group or an ethyl group is preferable because it is readily available.

Examples of the cyclic alkyl groups include a cyclopropyl group, a cyclobutyl group, a cyclopentyl group and a cyclohexyl group, and a cyclopentyl group or a cyclohexyl group is preferable because it is readily available.

The aforementioned "phenyl group in which a hydrogen atom may be substituted by a fluorine atom or an alkyl group of 1 to 6 carbon atoms" refers to a phenyl group in which part or all of the hydrogen atoms have been substituted by a fluorine atom or an alkyl group of 1 to 6 carbon atoms. The alkyl group of 1 to 6 carbon atoms is preferably a methyl group or an ethyl group, because it is readily available.

In the above general formula (b-2-1), each of n5 and n6 independently represents an integer of 0 to 10. Each of n5 and n6 is independently and preferably 0 to 6, more preferably 0 to 3, and most preferably 1 or 2, since the resin exhibits high levels of hardness and transparency, and the optical properties thereof are also improved.

As (b-2) included in the component B in the resin precursor composition of the present invention, compounds represented by the following chemical formulae (b-2-01) to (b-2-05) and the following chemical formulae (b-2-06) to (b-2-10) are particularly preferred. Note that with respect to the compound represented by the following chemical formulae (b-2-06) to (b-2-10), each of the phenyl groups corresponding to $R^{17}$ and $R^{18}$ may independently substitute a hydrogen atom at the ortho position or may substitute a hydrogen atom at the meta position.

[Chemical Formula 13]

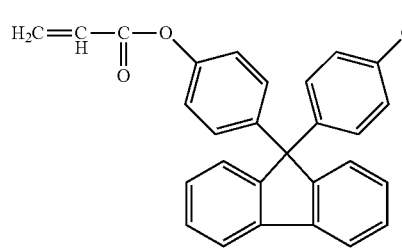
(b-2-01)

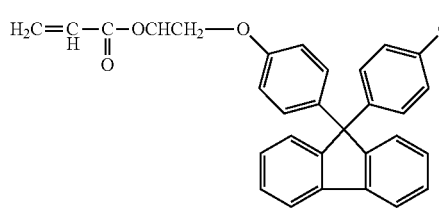
(b-2-02)

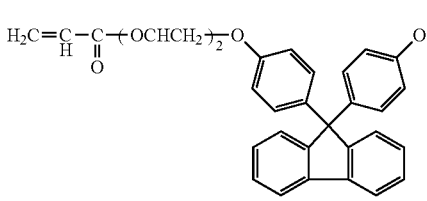
(b-2-03)

[Chemical Formula 14]

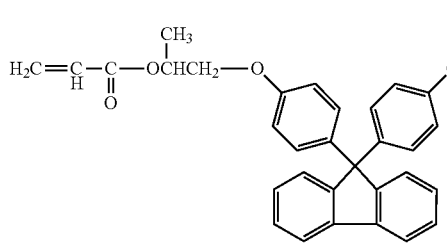
(b-2-04)

-continued

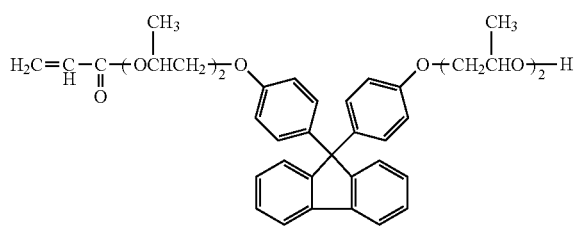
(b-2-05)

[Chemical Formula 15]

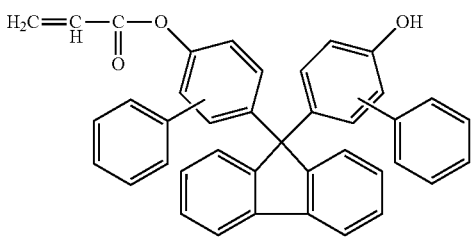
(b-2-06)

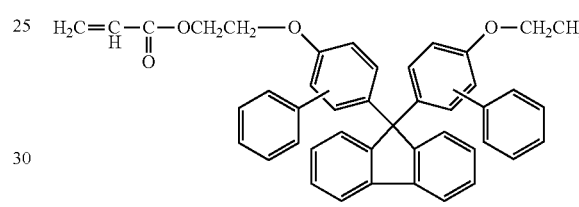
(b-2-07)

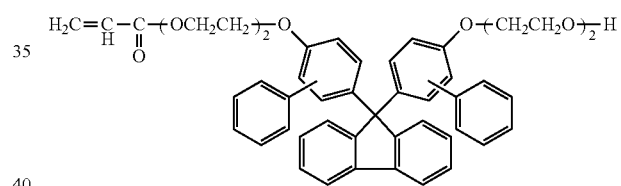
(b-2-08)

[Chemical Formula 16]

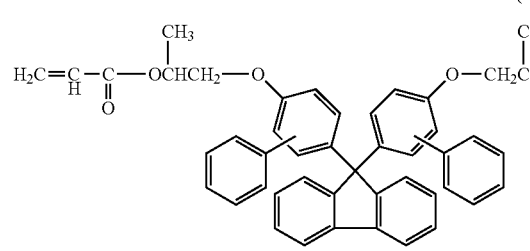
(b-2-09)

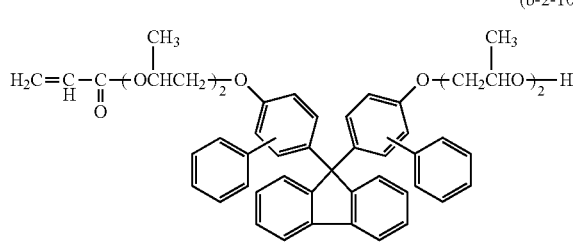
(b-2-10)

With respect to the compounds represented by the above general formula (b-1-1), the compounds represented by the above general formula (b-1-2) and the compounds represented by the above general formula and (b-2-1), commercially available products may be used, or they may be synthesized by known methods.

Examples of the synthesis methods include a method for carrying out an esterification reaction between 9,9-bis(4-hydroxyphenyl)fluorene having a fluorene skeleton or a derivative thereof and (meth)acrylic acid by an acid catalyst, such as methanesulfonic acid, in the presence of a polymerization inhibitor such as hydroquinone.

According to this method, the reaction solution after the reaction mainly contains (b-1) and (b-2) therein. The content ratio of (b-1) and (b-2) can be adjusted by appropriately adjusting the reaction time, and, for example, can also be adjusted to (b-1):(b-2)=90:10 to 70:30 (molar ratio). In this case, because a single synthesis reaction can yield both (b-1) and (b-2), it is suitable as a method for obtaining the component B in the resin precursor composition of the present invention. That is, by removing the unreacted compounds, the acid catalyst or the like that are remaining in the reaction mixture through purification, a reaction solution with the content ratio of (b-1):(b-2)=90:10 to 70:30 (molar ratio) can be obtained as a solution of the component B for the resin precursor composition of the present invention.

The molar ratio of (b-1) and (b-2) in the synthesis reaction solution can be determined by column chromatography equipped with a UV detector or the like.

It should be noted that in the aforementioned synthesis reaction, when synthesis reactions are carried out over a sufficiently long reaction time, the content of (b-2) is usually not more than 5%.

When preparing the component B of the resin precursor composition according to the present invention, (b-1) and (b-2) that are purified in advance may be mixed at the above ratio for preparation, or, as described above, (b-1) and (b-2) may be synthesized so as to be contained in the same reaction solution at the ratio described above, and then this reaction solution may be used for preparation.

In the component B of the resin precursor composition according to the present invention, (b-1) may be constituted of a single type of bifunctional (meth)acrylate having a fluorene structure, or may be constituted of two or more types of bifunctional (meth)acrylates having a fluorene structure.

Further, in the component B of the resin precursor composition according to the present invention, (b-2) may be constituted of a single type of monofunctional (meth)acrylate having a fluorene structure, or may be constituted of two or more types of monofunctional (meth)acrylates having a fluorene structure.

In order to achieve optical properties of low refractive index and high dispersion that are suitable for using a resin obtained from the resin precursor composition of the present invention in close-contact multilayer type diffractive optical elements, the content of the aforementioned component B within the above resin precursor composition is preferably not less than 10% by weight but not more than 80% by weight, more preferably not less than 20% by weight but not more than 70% by weight, and most preferably not less than 30% by weight but not more than 60% by weight.

In addition, the content of (b-1) and (b-2) within the above component B is preferably not less than 80% by weight and not more than 100% by weight, more preferably not less than 90% by weight and not more than 100% by weight, and may even be 100% by weight. When the content is within these ranges, the formation of precipitates during the storage of the resin precursor composition can be satisfactorily suppressed.

<Component C>

The component C in the resin precursor composition of the present invention is a photopolymerization initiator.

There are no particular limitations on the photopolymerization initiator as long as it is capable of initiating the polymerization of the aforementioned components A and B by irradiation of light, and known polymerization initiators used for photocuring resins can be used.

Light used for the above light irradiation can be appropriately selected depending on the photopolymerization initiator used, and visible light, ultraviolet rays, electron beam or the like is usually used.

In the resin precursor composition of the present invention, the content of the component C is usually within the range of 0.1 to 5.0% by weight, although depending on the type of the component C to be used and the type of light being irradiated.

More specifically, as the component C, for example, acetophenone-based photopolymerization initiators are preferable because of their excellent reactivity. Among these, alkyl phenyl ketones having a hydroxyl group at the α-position are preferable because yellowing of the resin can be suppressed, and 1-hydroxy-cyclohexyl-phenyl-ketone (Irgacure 184) is particularly preferable because yellowing of the resin can be further suppressed.

<Component D>

The resin precursor composition of the present invention may also include another component (component D), in addition to the above components A to C. By including the component D, the hardness and transparency of the resin as well as the optical properties can be adjusted to desired levels.

In the resin precursor composition of the present invention, the content of the component D is preferably 0 to 40% by weight, and may even be 0% by weight.

The component D may be one that copolymerizes with the above components A and B, or may be one that does not copolymerize, although one that copolymerizes is preferred because the optical properties of the resin are improved.

Specific examples of the component D include monofunctional (meth)acrylates, bifunctional (meth)acrylates, trifunctional (meth)acrylates and tetrafunctional (meth)acrylates.

Examples of the above monofunctional (meth)acrylates include methyl(meth)acrylate, ethyl(meth)acrylate, butyl (meth)acrylate, isodecyl(meth)acrylate, lauryl(meth)acrylate, tridecyl(meth)acrylate, cetyl(meth)acrylate, stearyl (meth)acrylate, tert-butyl(meth)acrylate, 2-ethylhexyl(meth) acrylate, 2-hydroxybutyl(meth)acrylate, 2-hydroxyethyl (meth)acrylate, 2-hydroxypropyl(meth)acrylate, 3-methoxybutyl(meth)acrylate, diethylaminoethyl(meth)acrylate, phenoxypolyethylene glycol(meth)acrylate, isostearyl(meth) acrylate, paracumylphenoxyethylene glycol(meth)acrylate, dimethylaminoethyl(meth)acrylate, 2-ethylhexylcarbitol (meth)acrylate, butoxyethyl(meth)acrylate, ethoxydiethylene glycol(meth)acrylate, lauroxypolyethylene glycol(meth) acrylate, polyethylene glycol(meth)acrylate, polypropylene glycol(meth)acrylate, acryloxypolyethylene glycol(meth) acrylate, stearoxypolyethylene glycol(meth)acrylate, octoxypolyethylene glycol-polypropylene glycol(meth)acrylate, poly(propylene glycol-tetramethylene glycol)(meth) acrylate, poly(ethylene glycol-tetramethylene glycol)(meth)

acrylate, methoxypolyethylene glycol(meth)acrylate, methoxypolypropylene glycol(meth)acrylate and benzyl (meth)acrylate.

Examples of the above bifunctional(meth)acrylates include 2-ethyl, 2-butyl-propanediol(meth)acrylate, 1,3-butylene glycol di(meth)acrylate, 1,6-hexanediol di(meth)acrylate, 1,9-nonanediol(meth)acrylate, 1,10-decanediol di(meth)acrylate, neopentyl glycol di(meth)acrylate, dipropylene glycol di(meth)acrylate, glycerol di(meth)acrylate, ethylene oxide-modified neopentyl glycol di(meth)acrylate, propylene oxide-modified neopentyl glycol di(meth)acrylate, ethylene oxide-modified bisphenol A di(meth)acrylate, propylene oxide-modified bisphenol A di(meth)acrylate, ethylene oxide/propylene oxide-modified bisphenol A di(meth)acrylate and butylethylpropanediol di(meth)acrylate.

Examples of the above trifunctional (meth)acrylates include tris(acryloxyethyl)isocyanurate, tris(methacryloxyethyl)isocyanurate, epichlorohydrin-modified glycerol tri(meth)acrylate, ethylene oxide-modified glycerol tri(meth)acrylate, propylene oxide-modified glycerol tri(meth)acrylate, caprolactone-modified trimethylolpropane tri(meth)acrylate, ethylene oxide-modified trimethylolpropane tri(meth)acrylate, propylene oxide-modified trimethylolpropane tri(meth)acrylate, pentaerythritol tri(meth)acrylate and trimethylolpropane tri(meth)acrylate.

Examples of the above tetrafunctional (meth)acrylates include pentaerythritol tetra(meth)acrylate, dipentaerythritolhydroxy penta(meth)acrylate and ditrimethylolpropane tetra(meth)acrylate.

Among these components D, phenoxyethylene glycol (meth)acrylate, methoxydiethylene glycol(meth)acrylate, benzyl(meth)acrylate or methoxytripropylene glycol(meth)acrylate, which is a monofunctional (meth)acrylate; or neopentyl glycol di(meth)acrylate or tripropylene glycol di(meth)acrylate, which is a bifunctional (meth)acrylate, is preferable because the compatibility and the optical properties of the resin are improved.

As described above, the resin precursor composition of the present invention is characterized by containing the aforementioned components A, B and C, in which the molar ratio of (b-1) and (b-2) in the component B is (b-1):(b-2)=90:10 to 70:30 (molar ratio), and brings about remarkable effects to suppress the formation of precipitates during the storage thereof.

A photocurable resin obtained, through photocuring, by irradiating light onto the resin precursor composition of the present invention is thought to be a (meth)acrylic resin in which the components A and B are randomly copolymerized.

For example, as a suitable resin precursor composition of the present invention, a resin precursor composition in which the component A is a compound represented by the above general formula (a-1), and the component B is a compound represented by a general formula (b-1-1) shown below and a compound represented by a general formula (b-2-1) shown below may be used. A photocurable resin obtained, through photocuring, by irradiating light onto this resin precursor composition is a random copolymer of these compounds. The structural units (A-1-1), (B-1-1) and (B-2-1) of the random copolymer are represented by the following general formulae (A-1-1), (B-1-1) and (B-2-1), respectively.

[Chemical Formula 17]

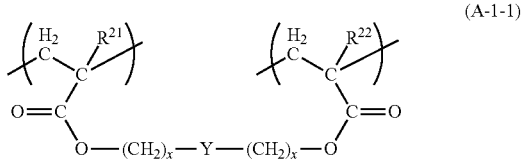

(A-1-1)

[In the formula, each of $R^{21}$ and $R^{22}$ independently represents a hydrogen atom or a methyl group; x represents an integer of 1 to 2; and Y represents a perfluoroalkyl group of 2 to 12 carbon atoms or $—(CF_2—O—CF_2)_z—$, in which the above z represents an integer of 1 to 4].

[Chemical Formula 18]

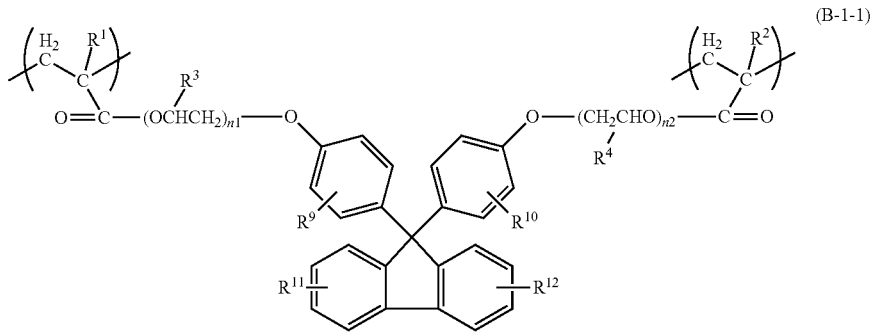

(B-1-1)

[In the formula, each of $R^1$ and $R^2$ independently represents a hydrogen atom or a methyl group; each of $R^3$ and $R^4$ independently represents a hydrogen atom, a methyl group or an ethyl group; each of $R^9$, $R^{10}$, $R^{11}$ and $R^{12}$ independently represents a hydrogen atom, a fluorine atom, an alkyl group of 1 to 6 carbon atoms, or a phenyl group in which a hydrogen atom may be substituted by a fluorine atom or an alkyl group of 1 to 6 carbon atoms; and each of n1 and n2 independently represents an integer of 0 to 3.]

[Chemical Formula 19]

(B-2-1)

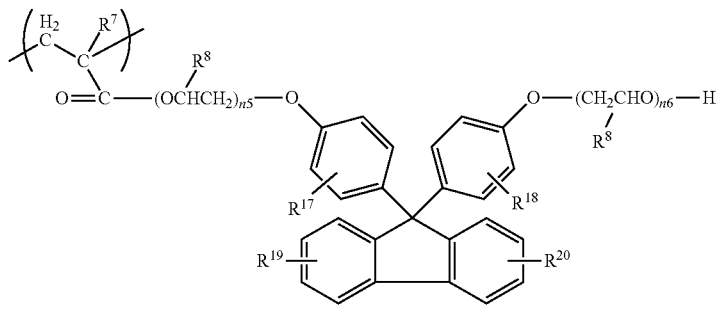

[In the formula, $R^7$ represents a hydrogen atom or a methyl group; $R^8$ represents a hydrogen atom or a linear or branched alkyl group of 1 to 6 carbon atoms; each of $R^{17}$, $R^{18}$, $R^{19}$ and $R^{20}$ independently represents a hydrogen atom, a fluorine atom, an alkyl group of 1 to 6 carbon atoms, or a phenyl group in which a hydrogen atom may be substituted by a fluorine atom or an alkyl group of 1 to 6 carbon atoms; and each of n5 and n6 independently represents an integer of 0 to 10.]

The explanations for $R^{21}$, $R^{22}$, x, Y and z in the above general formula (A-1-1) are the same as those provided for $R^{21}$, $R^{22}$, x, Y and z in the above general formula (a-1).

The explanations for $R^1$, $R^2$, $R^3$, $R^4$, $R^9$, $R^{10}$, $R^{11}$, $R^{12}$, n1 and n2 in the above general formula (B-1-1) are the same as those provided for $R^1$, $R^2$, $R^3$, $R^4$, $R^9$, $R^{10}$, $R^{11}$, $R^{12}$, n1 and n2 in the above general formula (b-1-1).

The explanations for $R^5$, $R^6$, $R^{13}$, $R^{14}$, $R^{15}$, $R^{16}$, n3 and n4 in the above general formula (B-2-1) are the same as those provided for $R^5$, $R^6$, $R^{13}$, $R^{14}$, $R^{15}$, $R^{16}$, n3 and n4 in the above general formula (b-2-1).

A photocurable resin obtained, through photocuring, by irradiating light onto the resin precursor composition of the present invention may have optical properties of low refractive index and high dispersion.

For example, by adjusting the content of the component A in the resin precursor composition within the range of 10% by weight to 80% by weight, and adjusting the content of the component B in the resin precursor composition within the range of 10% by weight to 80% by weight, it is possible to set the refractive index $n_d$ of resin after photocuring to 1.54 or less and to set the mean dispersion ($n_F$–$n_C$) of the resin to 0.0145 or more.

Resins having such optical properties of low refractive index and high dispersion are suitable as resins for optical elements and are particularly suitable as resins for close-contact multilayer type diffractive optical elements. Incidentally, close-contact multilayer type diffractive optical elements are optical elements prepared by laminating, in close contact, a resin with the optical properties of high refractive index and low dispersion, and a resin with the optical properties of low refractive index and high dispersion. Note that a relief pattern is formed at the interface between the resin with high refractive index and low dispersion and the resin with low refractive index and high dispersion. The relief pattern may have a blaze shape or a rectangular shape, and several blaze shapes and several rectangular shapes are formed at the interface. In addition, the shape of the interface of the resin with high refractive index and low dispersion has the inverted shape of the interface of the resin with low refractive index and high dispersion. Note that for the grating height of the blaze pattern, a fixed height is set, which is determined in accordance with the ratio of the difference between the refractive index of a high-refractive-index, low-dispersion resin and the refractive index of a low-refractive-index, high-dispersion resin (hereafter, referred to as refractive index difference), and a certain wavelength within the wavelength range used. When the product of the refractive index difference and the grating height of the blaze pattern is an integral multiple of a certain wavelength within the wavelength range used, the diffraction efficiency of a predetermined diffraction order is increased, which is preferable. The phase difference of light beams caused by the relief pattern at the interface between the resin with high refractive index and low dispersion and the resin with low refractive index and high dispersion does not change greatly even if the wavelength is changed. Therefore, the resin precursor composition of the present invention is suitable as a resin precursor composition for close-contact multilayer type diffractive optical elements.

A resin for close-contact multilayer type diffractive optical elements obtained, through photocuring, by irradiating light onto the aforementioned resin precursor composition for close-contact multilayer type diffractive optical elements is suitable as a material of close-contact multilayer type diffractive optical elements. The optical properties of the close-contact multilayer type diffractive optical elements will be described below.

In the close-contact multilayer type diffractive optical elements, it is required that one of the optical components sandwiching a diffractive optical surface exhibit the optical properties of relatively high refractive index and low dispersion while the other component exhibit the optical properties of relatively low refractive index and high dispersion. Here, as an optical material with high refractive index and low dispersion, low-melting-point glass is used in many cases. In this case, a close-contact multilayer type diffractive optical element can be prepared by forming a diffraction plane on glass by a glass molding method, followed by lamination of the photocurable resin according to the present invention thereon. As one of the low-melting-point glass used for such applications, there is K-PSK60 (manufactured by Sumita Optical Glass, Inc.).

The grating height $d_0$ which is optimized so that an $m_0$th-order diffraction efficiency becomes 100% at the wavelength of $\lambda 0$ is expressed by the following formula, where $n_1(\lambda_0)$ and $n_2(\lambda_0)$ represent the refractive index of a material with high refractive index and low dispersion and material with low refractive index and high dispersion, respectively, at $\lambda_0$: $\{n_1(\lambda_0) - n_2(\lambda_0)\} \times d_0 = m_0 \times d_0$. In other words, the grating height $d_0$ is inversely proportional to the difference in refractive index between the material with high refractive index and low dispersion and the material with low refractive index and high dispersion.

Further, an mth-order diffraction efficiency $\eta_m$ is expressed by the formula: $\eta_m = \{\sin(a-m)\pi/(a-m)\pi\}^2$, where $a = \{(n_1-1)d - (n_2-1)d\}/\lambda$.

In general, it is desirable that the diffractive optical elements have a low grating height so as to reduce the field angle dependency, and have a high diffraction efficiency over the wavelength range used so as to reduce the flare. Thus, when K-PSK60 is combined with the photocurable resin of the present invention (for example, $n_d$=1.54, $n_F-n_C$=1.5502-1.5357=0.0145), it is apparent that a close-contact multilayer type diffractive optical element can be achieved, which has a low grating height of 11.55 μm, and also an excellent diffraction efficiency of 95% or more over a visible light range: 95% at an F-line (wavelength: 486.13 nm), 100% at a d-line (wavelength: 587.56 nm), and 98% at a C-line (wavelength: 656.27 nm).

Therefore, when the resin precursor composition of the present invention is used as a resin precursor composition for close-contact multilayer type diffractive optical elements, it is preferable that the refractive index $n_d$ after photocuring be 1.54 or less, and the mean dispersion $(n_F-n_C)$ of the resin be 0.0145 or more. In this case, it is preferable that the refractive index $n_d$ of the other optical components in the close-contact multilayer type diffractive optical elements be 1.55 or more, and the mean dispersion $(n_F-n_C)$ of the resin be 0.013 or less.

Specific methods for producing close-contact multilayer type diffractive optical elements with such optical properties are known, and have been disclosed in, for example, paragraphs [0055] to [0057] in Patent Document 2.

EXAMPLES

As follows is a more detailed description of the present invention based on a series of examples, although the scope of the present invention is in no way limited by these examples.

Examples 1 to 12, Comparative Examples 1 to 6

The components shown in Table 1 were mixed together and dissolved to prepare resin precursor compositions. The molar ratios of (b-1) to (b-2) in the components B are also shown in Table 1.

TABLE 1

| | Component A | Component B | (b-1):(b-2) (molar ratio) | (b-1)/(b-2) (molar ratio) | Component C | Component D |
|---|---|---|---|---|---|---|
| Comp. Ex. 1 | (A)-1 [57] | (B)-1 [43] | 95:5 | 19.0 | (C)-1 [0.5] | — |
| Ex. 1 | (A)-1 [57] | (B)-2 [43] | 90:10 | 9.00 | (C)-1 [0.5] | — |
| Ex. 2 | (A)-1 [57] | (B)-3 [43] | 88:12 | 7.33 | (C)-1 [0.5] | — |
| Ex. 3 | (A)-1 [57] | (B)-4 [43] | 79:21 | 3.76 | (C)-1 [0.5] | — |
| Ex. 4 | (A)-1 [57] | (B)-5 [43] | 76:24 | 3.17 | (C)-1 [0.5] | — |
| Comp. Ex. 2 | (A)-1 [57] | (B)-6 [43] | 55:45 | 1.22 | (C)-1 [0.5] | — |
| Comp. Ex. 3 | (A)-1 [53] | (B)-1 [42] | 95:5 | 19.0 | (C)-1 [0.5] | (D)-1 [5] |
| Ex. 5 | (A)-1 [53] | (B)-2 [42] | 90:10 | 9.00 | (C)-1 [0.5] | (D)-1 [5] |
| Ex. 6 | (A)-1 [53] | (B)-3 [42] | 88:12 | 7.33 | (C)-1 [0.5] | (D)-1 [5] |
| Ex. 7 | (A)-1 [53] | (B)-4 [42] | 79:21 | 3.76 | (C)-1 [0.5] | (D)-1 [5] |
| Ex. 8 | (A)-1 [53] | (B)-5 [42] | 76:24 | 3.17 | (C)-1 [0.5] | (D)-1 [5] |
| Comp. Ex. 4 | (A)-1 [53] | (B)-6 [42] | 55:45 | 1.22 | (C)-1 [0.5] | (D)-1 [5] |
| Comp. Ex. 5 | (A)-1 [52] | (B)-1 [43] | 95:5 | 19.0 | (C)-1 [0.5] | (D)-2 [5] |
| Ex. 9 | (A)-1 [52] | (B)-2 [43] | 90:10 | 9.00 | (C)-1 [0.5] | (D)-2 [5] |
| Ex. 10 | (A)-1 [52] | (B)-3 [43] | 88:12 | 7.33 | (C)-1 [0.5] | (D)-2 [5] |
| Ex. 11 | (A)-1 [52] | (B)-4 [43] | 79:21 | 3.76 | (C)-1 [0.5] | (D)-2 [5] |
| Ex. 12 | (A)-1 [52] | (B)-5 [43] | 76:24 | 3.17 | (C)-1 [0.5] | (D)-2 [5] |
| Comp. Ex. 6 | (A)-1 [52] | (B)-6 [43] | 55:45 | 1.22 | (C)-1 [0.5] | (D)-2 [5] |

In Table 1, the values in brackets [ ] indicate the amount (in terms of parts by weight) of the component added. Further, the reference characters in Table 1 indicate the following.

(A)-1: 2,2,3,3,4,4,5,5-octafluorohexane-1,6-diacrylate (B)-1: a mixture containing a compound represented by the aforementioned chemical formula (b-1-02) and a compound represented by the aforementioned chemical formula (b-2-02) at a ratio of 95:5 (molar ratio)

(B)-2: a mixture containing a compound represented by the aforementioned chemical formula (b-1-02) and a compound represented by the aforementioned chemical formula (b-2-02) at a ratio of 90:10 (molar ratio)

(B)-3: a mixture containing a compound represented by the aforementioned chemical formula (b-1-02) and a compound represented by the aforementioned chemical formula (b-2-02) at a ratio of 88:12 (molar ratio)

(B)-4: a mixture containing a compound represented by the aforementioned chemical formula (b-1-02) and a compound represented by the aforementioned chemical formula (b-2-02) at a ratio of 79:21 (molar ratio)

(B)-5: a mixture containing a compound represented by the aforementioned chemical formula (b-1-02) and a compound represented by the aforementioned chemical formula (b-2-02) at a ratio of 76:24 (molar ratio)

(B)-6: a mixture containing a compound represented by the aforementioned chemical formula (b-1-02) and a compound represented by the aforementioned chemical formula (b-2-02) at a ratio of 55:45 (molar ratio)

(C)-1: Irgacure 184 (manufactured by Ciba Specialty Chemicals)

(D)-1: phenoxyethylene glycol acrylate (D)-2: methoxypolypropylene glycol acrylate Note that the components B represented by the above reference characters (B)-1 to (B)-6 were obtained by a synthesis method of esterifying 9,9-bis(4-ethoxyphenyl) fluorene and acrylic acid by an acid catalyst of methanesulfonic acid, in the presence of hydroquinone. At that time, by appropriately adjusting the reaction time, the content ratio of (b-1) and (b-2) was set to a desired molar ratio. The molar ratio was confirmed by analyzing the reaction solution by column chromatography equipped with a UV detector. The component B obtained by removing the components other than (b-1) and (b-2) from the reaction solution was used in the preparation of the above resin precursor composition.

Each of the thus obtained resin precursor compositions was dispensed into four light-shielding glass bottles and stored at room temperature to examine the formation of precipitates. The results are shown in Table 2.

TABLE 2

| | Storage period | | | |
|---|---|---|---|---|
| | After 3 weeks | After 5 weeks | After 8 weeks | After six months |
| Comp. Ex. 1 | x (4) | | | |
| Ex. 1 | ○ | Δ (2) | | |
| Ex. 2 | ○ | ○ | Δ (2) | |
| Ex. 3 | ○ | ○ | ○ | ○ |
| Ex. 4 | ○ | ○ | ○ | ○ |
| Comp. Ex. 2 | — | — | — | — |
| Comp. Ex. 3 | x (4) | | | |
| Ex. 5 | ○ | Δ (2) | | |
| Ex. 6 | ○ | ○ | Δ (2) | |
| Ex. 7 | ○ | ○ | ○ | ○ |
| Ex. 8 | ○ | ○ | ○ | ○ |
| Comp. Ex. 4 | — | — | — | — |
| Comp. Ex. 5 | x (4) | | | |
| Ex. 9 | ○ | Δ (2) | | |
| Ex. 10 | ○ | ○ | Δ (2) | |
| Ex. 11 | ○ | ○ | ○ | ○ |
| Ex. 12 | ○ | ○ | ○ | ○ |
| Comp. Ex. 6 | — | — | — | — |

In Table 2, "x" indicates that precipitates were formed, "Δ" indicates that a trace amount of precipitates was formed, and "○" indicates that no precipitates were observed. In addition, the values in parentheses ( ) indicate the number of light shielding glass bottles in which the formation of (a trace amount of) precipitates was observed. Note that in Comparative Examples 2, 4 and 6, the resin precursor compositions became cloudy immediately after the preparation thereof, and thus the formation of precipitates could not be evaluated.

In addition, ultraviolet rays (wavelength: 365 nm) at 8,000 mJ/cm$^2$ were irradiated onto each of the resin precursor compositions of Examples 1 to 12 and Comparative Examples 1, 3 and 5, amongst the prepared resin precursor compositions, except for those of Comparative Examples 2, 4 and 6 which became cloudy, thereby obtaining photocurable resins as a result of photocuring. The refractive index of the thus obtained photocurable resins (at 22.5° C.) was measured. As a result, in all photocurable resins, the refractive index $n_d$ was 1.528 and the mean dispersion ($n_F-n_C$) was 0.0150.

From the above results, it was confirmed that: no precipitates were formed in the resin precursor compositions of Examples 1 to 12 according to the present invention even after 3 weeks of storage period; no precipitates were formed in the resin precursor compositions of Examples 2, 3, 4, 6, 7, 8, 10, 11 and 12 even after 5 weeks of storage period; and no precipitates were formed in the resin precursor compositions of Examples 3, 4, 7, 8, 11 and 12 even after six months of storage period. On the other hand, precipitates were formed in all of the resin precursor compositions of Comparative Examples 1, 3 and 5 after 3 weeks of storage period without exception.

In addition, it was confirmed that all of the photocurable resins, obtained by photocuring the resin precursor compositions of Examples 1 to 12 according to the present invention, by irradiating ultraviolet rays thereto, exhibited excellent optical properties of low refractive index and high dispersion, and are thus suitable as resins for constituting the close-contact multilayer type diffractive optical elements.

The invention claimed is:

1. A resin precursor composition comprising:

a bifunctional fluorine-containing acrylate and/or a bifunctional fluorine-containing methacrylate (component A);

an acrylate having a fluorene structure and/or a methacrylate having a fluorene structure (component B); and a photopolymerization initiator (component C), wherein said component B includes a bifunctional acrylate having a fluorene structure and/or a bifunctional methacrylate having a fluorene structure (b-1), and a monofunctional acrylate having a fluorene structure and/or a monofunctional methacrylate having a fluorene structure (b-2) at a molar ratio (b-1):(b-2) of 90:10 to 70:30.

2. The resin precursor composition according to claim 1, wherein said component A is a compound represented by the following general formula (a-1):

[Chemical Formula 20]

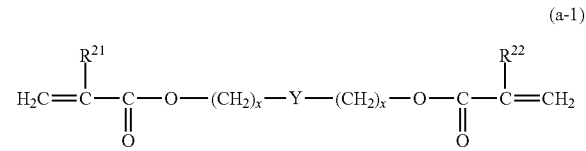

(a-1)

[wherein, each of $R^{21}$ and $R^{22}$ independently represents a hydrogen atom or a methyl group; x represents an integer of 1 to 2; and Y represents a perfluoroalkyl group of 2 to 12 carbon atoms or —(CF$_2$—O—CF$_2$)$_z$—, with a proviso that said z represents an integer of 1 to 4].

3. The resin precursor composition according to claim 1, wherein said (b-1) is a compound represented by the following general formula (b-1-1) and/or a compound represented by the following general formula (b-1-2):

[Chemical Formula 21]

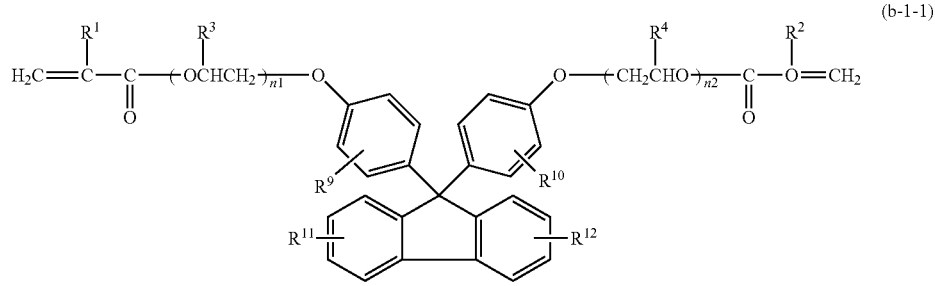
(b-1-1)

[wherein each of $R^1$ and $R^2$ independently represents a hydrogen atom or a methyl group; each of $R^3$ and $R^4$ independently represents a hydrogen atom, a methyl group or an ethyl group; each of $R^9$, $R^{10}$, $R^{11}$ and $R^{12}$ independently represents a hydrogen atom, a fluorine atom, an alkyl group of 1 to 6 carbon atoms, or a phenyl group in which a hydrogen atom may be substituted by a fluorine atom or an alkyl group of 1 to 6 carbon atoms; and each of n1 and n2 independently represents an integer of 0 to 3];

[wherein $R^7$ represents a hydrogen atom or a methyl group; $R^8$ represents a hydrogen atom or a linear or branched alkyl group of 1 to 6 carbon atoms; each of $R^{17}$, $R^{18}$, $R^{19}$ and $R^{20}$ independently represents a hydrogen atom, a fluorine atom, an alkyl group of 1 to 6 carbon atoms, or a phenyl group in which a hydrogen atom may be substituted by a fluorine atom or an alkyl group of 1 to 6 carbon atoms; and each of n5 and n6 independently represents an integer of 0 to 10].

[Chemical Formula 22]

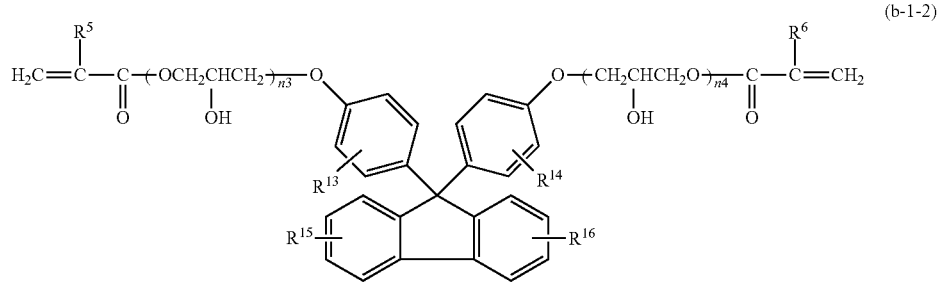
(b-1-2)

[wherein each of $R^5$ and $R^6$ independently represents a hydrogen atom or a methyl group; each of $R^{13}$, $R^{14}$, $R^{15}$ and $R^{16}$ independently represents a hydrogen atom, a fluorine atom, an alkyl group of 1 to 6 carbon atoms, or a phenyl group in which a hydrogen atom may be substituted by a fluorine atom or an alkyl group of 1 to 6 carbon atoms; and each of n3 and n4 independently represents an integer of 1 to 3].

4. The resin precursor composition according to claim 1, wherein said (b-2) is a compound represented by the following general formula (b-2-1):

5. The resin precursor composition according to claim 1, which is a resin precursor composition for close-contact multilayer type diffractive optical elements.

6. A photocurable resin obtained by photocuring the resin precursor composition according to claim 1.

7. The resin according to claim 6, wherein a refractive index $n_d$ is equal to or less than 1.54, and a mean dispersion $(n_F - n_C)$ is equal to or more than 0.0145.

[Chemical Formula 23]

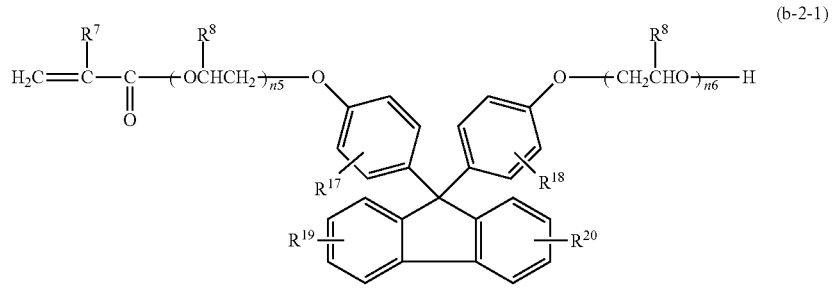
(b-2-1)

8. A resin precursor composition comprising:
a bifunctional fluorine-containing acrylate and/or a bifunctional fluorine-containing methacrylate (component A);
an acrylate having a fluorene structure and/or a methacrylate having a fluorene structure (component B); and
a photopolymerization initiator (component C),
wherein said component B includes a bifunctional acrylate having a fluorene structure and a monofunctional acrylate having a fluorene structure.

* * * * *